is

(12) United States Patent
Skinner et al.

(10) Patent No.: US 7,940,974 B2
(45) Date of Patent: May 10, 2011

(54) METHOD AND SYSTEM FOR ADJUSTING 3D CT VESSEL SEGMENTATION

(75) Inventors: John V. Skinner, New Berlin, WI (US); Gopal B. Avinash, New Berlin, WI (US); Patricia Le Nezet, Le Pecq (FR); Sandeep Dutta, Waukesha, WI (US); Saad Ahmed Sirohey, Pewaukee, WI (US); Deann Marie Haas, Port Washington, WI (US)

(73) Assignee: General Electric Company, Schenectady, NY (US)

( * ) Notice: Subject to any disclaimer, the term of this patent is extended or adjusted under 35 U.S.C. 154(b) by 997 days.

(21) Appl. No.: 11/602,909

(22) Filed: Nov. 21, 2006

(65) Prior Publication Data

US 2008/0137926 A1 Jun. 12, 2008

(51) Int. Cl.
*G06K 9/00* (2006.01)
(52) U.S. Cl. .................................................. 382/131
(58) Field of Classification Search .............. 382/100, 382/128, 129, 130, 131, 132, 133, 134, 173, 382/181; 128/920; 600/300, 407; 378/1, 378/37, 21, 41, 42, 38, 44, 51, 62, 65, 146
See application file for complete search history.

(56) References Cited

U.S. PATENT DOCUMENTS

| | | | | |
|---|---|---|---|---|
| 6,701,174 B1* | 3/2004 | Krause et al. | | 600/407 |
| 2002/0136440 A1* | 9/2002 | Yim et al. | | 382/131 |
| 2004/0066958 A1* | 4/2004 | Chen et al. | | 382/128 |
| 2004/0101183 A1* | 5/2004 | Mullick et al. | | 382/131 |
| 2004/0249270 A1* | 12/2004 | Kondo et al. | | 600/425 |
| 2006/0079743 A1* | 4/2006 | Ferrant et al. | | 600/407 |
| 2006/0094951 A1* | 5/2006 | Dean et al. | | 600/407 |
| 2006/0241427 A1* | 10/2006 | Kinouchi et al. | | 600/437 |
| 2007/0019846 A1* | 1/2007 | Bullitt et al. | | 382/128 |
| 2009/0279752 A1* | 11/2009 | Sirohey et al. | | 382/128 |

FOREIGN PATENT DOCUMENTS

WO WO2004/110309 A2 * 12/2004

OTHER PUBLICATIONS

Faber et al. ("Three-Dimensional Fusion of Coronary Arteries with Myocardial Perfusion Distributions: Clinical Validation", Journal of Nuclear Medicine, vol. 45 No. 5 745-753, 2004).*

(Continued)

*Primary Examiner* — Bhavesh M Mehta
*Assistant Examiner* — Tahmina Ansari
(74) *Attorney, Agent, or Firm* — Dean Small; The Small Patent Law Group

(57) ABSTRACT

Method and system for processing an object within a diagnostic image comprises segmenting a three dimensional (3D) object within a diagnostic image. A contour of the object is fitted with a 3D mesh comprising splines in at least first and second directions. The splines provide a plurality of editable control points, and the splines in the first direction intersect with the splines in the second direction at intersection points. A position of at least one control point on the 3D mesh is adjusted based on a user input.

21 Claims, 7 Drawing Sheets

OTHER PUBLICATIONS

Figueiredo et al., "Adaptive B-splines and boundary estimation", Computer Vision and Pattern Recognition, 1997. Proceedings., 1997 IEEE Computer Society Conference on Digital Object Identifier: 10.1109/CVPR.1997.609406 Publication Year: 1997, pp. 724-730.*

Alejandro F. Frangi, Wiro J. Niessen, Romhild M. Hoogeveen, Theo Van Walsum and Max A. Viergever. *Model-Based Quantitation of 3-D Magnetic Resonance Angiographic Images.* IEEE Transactions on Medical Imaging, vol. 18, No. 10, Oct. 1999, 10 pgs.

David F. Rogers and J. Alan Adams, Mathematical Elements for Computer Graphics, Copyright 1990, 1976 by McGraw-Hill, Inc., Chapters 4, 5 and 6, pp. 207-479.

* cited by examiner

METHOD AND SYSTEM FOR ADJUSTING 3D CT VESSEL SEGMENTATION

BACKGROUND OF THE INVENTION

This invention relates generally to processing computer tomography (CT) datasets, and more particularly, to detecting contours of elongated structures such as blood vessels within CT datasets.

Cardiovascular related deaths constitute more than 500,000 people annually in the USA, and much more globally. A major portion of the deaths are attributed to coronary artery disease, where the chief culprit is the build up of plaque, such as soft plaque and its ruptures, as well as hard plaque or calcification.

Typically in x-ray or non-contrasted CT studies, soft plaque is not easily detectable. Calcified plaque, therefore, has been used as a surrogate for the presence of soft plaque, based on the reasoning that calcified plaque is the by-product of ruptured plaque. Coronary plaque has been classified into six stages according to the Stary scale. According to general consensus, it is crucial to determine the plaque in stages 4 and 5 as the plaque constitutes critical vulnerable plaque and could lead to rupture or dislodging of the plaque, causing blockages and leading to myocardial infarction. Plaque and its constituency may be determined by IntraVascular Ultrasound (IVUS). However, the procedure is only performed on symptomatic patients due to its invasive nature. Unfortunately, symptomatic patients are already at an advanced stage and past non-invasive therapy options.

Newer scanning technologies, such as Cardiac Virtual CT (VCT) and associated increases in spatial and temporal resolution have made it possible to image a contrasted study of the heart which is gated to mitigate heart motion. Using these images, it is possible to distinguish soft plaque from lumen (the vessel wall) and from calcification. However, automated methods do not exist and thus standardization and productivity suffer due to the volume of data to be reviewed and manually processed.

Therefore, a need exists for automating aspects of locating vessel walls to better enable computation of metrics associated with the vessel, as well as with any deposits within the vessel. Certain embodiments of the present invention are intended to meet these needs and other objectives that will become apparent from the description and drawings set forth below.

BRIEF DESCRIPTION OF THE INVENTION

In one embodiment, a method for processing an object within a diagnostic image comprises segmenting a three dimensional (3D) object within a diagnostic image. A contour of the object is fitted with a 3D mesh comprising splines in at least first and second directions. The splines provide a plurality of editable control points, and the splines in the first direction intersect with the splines in the second direction at intersection points. A position of at least one control point on the 3D mesh is adjusted based on a user input.

In another embodiment, a computer for processing computed tomography (CT) diagnostic image data comprises a user interface with a processor coupled thereto. The processor is configured to segment a 3D object within a CT image, and fit a contour of the object with a 3D mesh comprising splines in at least first and second directions. The splines provide a plurality of editable control points, and the splines in the first direction intersect with the splines in the second direction at intersection points. The processor adjusts a position of at least one control point on the 3D mesh based on a user defined intersection point input by an operator using the user interface.

In another embodiment, a method for defining an object within a diagnostic image comprises segmenting an elongated object within a diagnostic image to detect a contour of the elongated object which has radial and longitudinal directions. Cross-sectional planes are defined within the object in the radial direction. Each of the cross-sectional planes has radial lines extending beyond the contour of the object. An optimal intersection point is selected along each of the radial lines to define an intersection of the cross-sectional plane with the contour. The optimal intersection points are based on at least one of minimizing discontinuities between the radial lines located on adjacent cross-sectional planes and minimizing discontinuities between adjacent radial lines located on the same cross-sectional plane. The elongated object is fitted with a 3D mesh having cross-sectional splines and longitudinal splines formed along the contour in the radial and longitudinal directions, respectively. The splines are based on at least the optimal intersection points.

Figure 1:
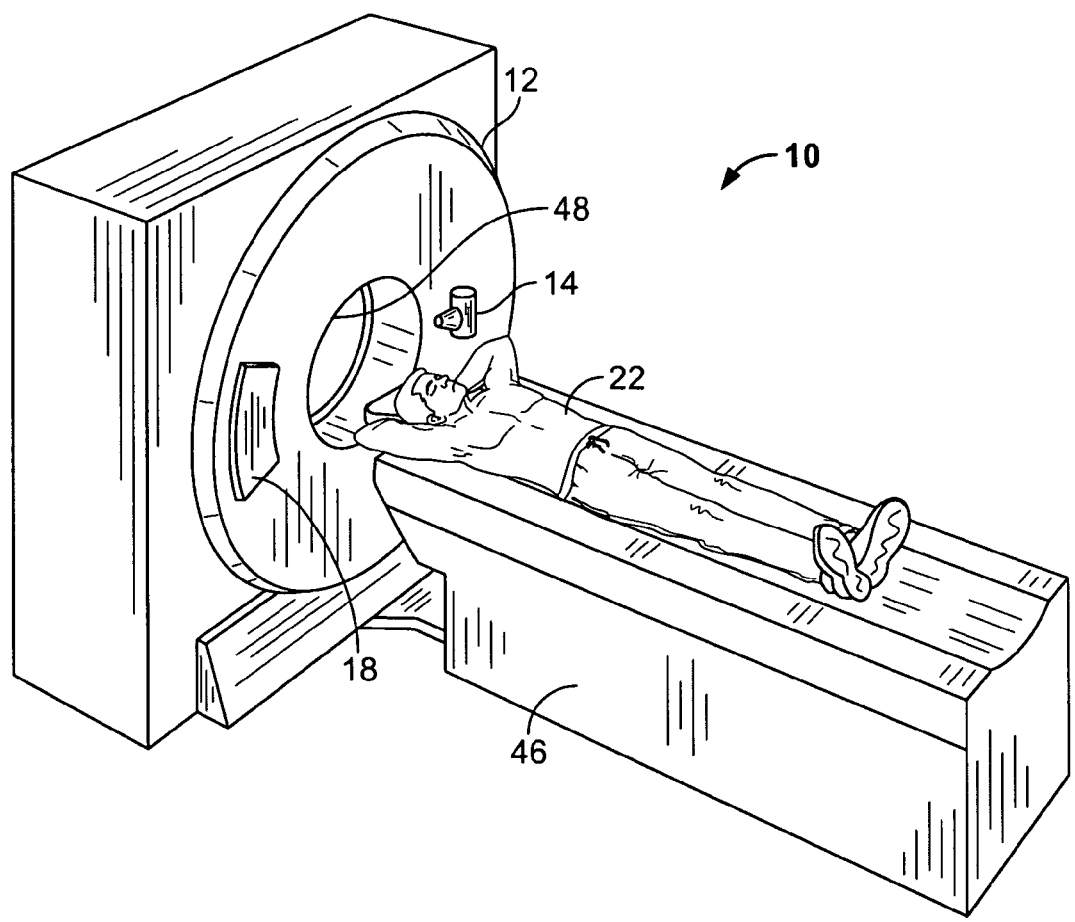
FIG. 1 illustrates a pictorial view of a computed tomography (CT) imaging system in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor, random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

DETAILED DESCRIPTION OF THE INVENTION

Figure 2:
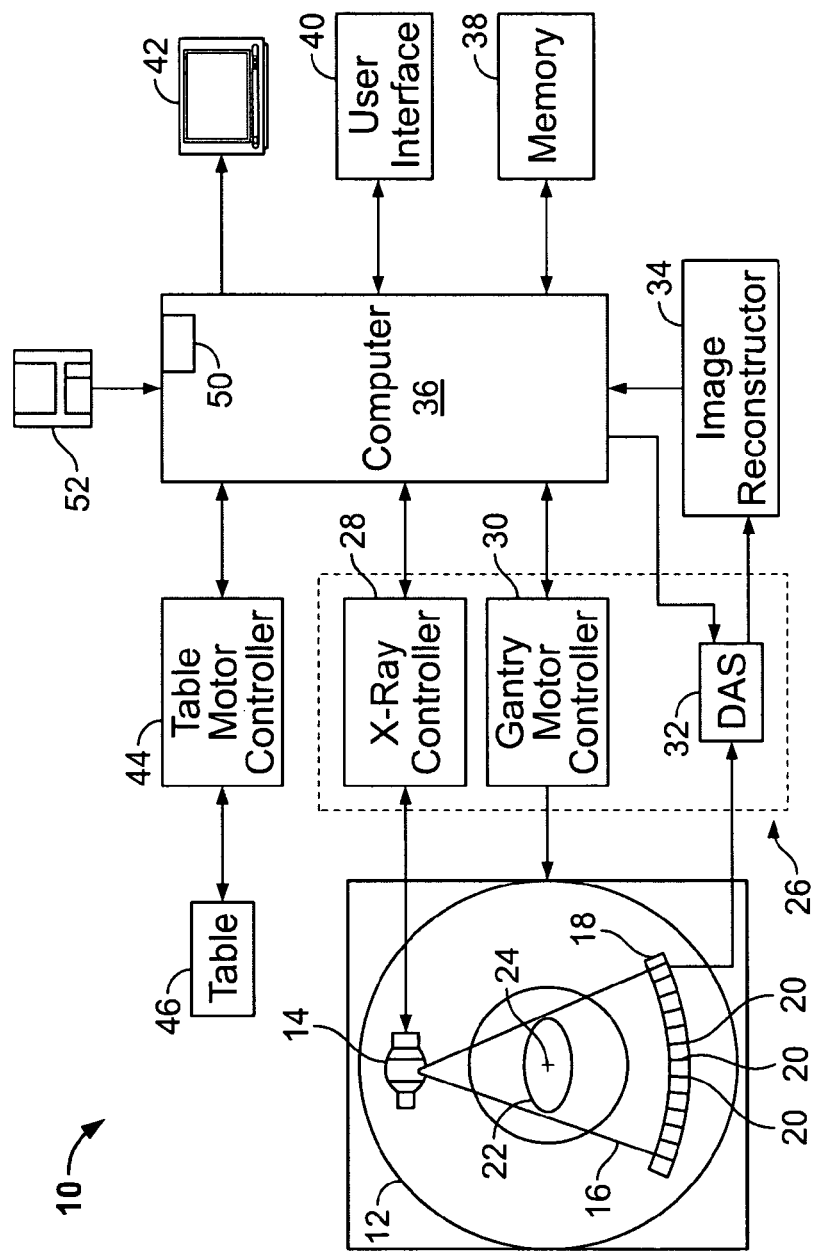
FIG. 2 illustrates a block diagram of the system of FIG. 1 in accordance with an embodiment of the present invention.

FIG. 1 illustrates a pictorial view of a computed tomography (CT) imaging system 10. The system 10 includes a gantry 12 representative of a "third generation" CT imaging system. FIG. 2 illustrates a block diagram of the system 10 of FIG. 1, and will be discussed together with FIG. 1.

The gantry 12 has an x-ray source 14 that projects a beam of x-rays 16 toward a detector array 18 on the opposite side of the gantry 12. The detector array 18 is formed by a plurality of detector rows (not shown) including a plurality of detector elements 20 which together sense the projected x-rays that pass through an object, such as a medical patient 22. Each detector element 20 produces an electrical signal that represents the intensity of an impinging x-ray beam and hence the attenuation of the beam as it passes through the patient 22. During a scan to acquire x-ray projection data, the gantry 12 and the components mounted thereon rotate about a center of rotation 24. FIG. 2 shows only a single row of detector elements 20 (i.e., a detector row). However, multi-slice detector array 18 includes a plurality of parallel detector rows of detector elements 20 such that projection data corresponding to a plurality of quasi-parallel or parallel slices can be acquired simultaneously during a scan.

Rotation of the gantry 12 and the operation of the x-ray source 14 are governed by a control mechanism 26 of the CT system 10. The control mechanism 26 includes an x-ray controller 28 that provides power and timing signals to the x-ray source 14 and a gantry motor controller 30 that controls the rotational speed and position of the gantry 12. A data acquisition system (DAS) 32 in the control mechanism 26 samples analog data from the detector elements 20 and converts the data to digital signals for subsequent processing. An image reconstructor 34 receives sampled and digitized x-ray data from the DAS 32 and performs high-speed image reconstruction. The reconstructed image is applied as an input to a computer 36 which stores the image in memory 38.

The computer 36 also receives commands and scanning parameters from an operator via user interface 40 that has input devices such as a keyboard, mouse, trackball and the like. An associated display 42 allows the operator to observe the reconstructed image and other data from the computer 36. Optionally, operator input may be provided through a touch screen monitor. The operator supplied commands and parameters are used by the computer 36 to provide control signals and information to the DAS 32, x-ray controller 28, and gantry motor controller 30. In addition, the computer 36 operates a table motor controller 44 which controls a motorized table 46 to position the patient 22 with respect to the gantry 12. Particularly, the table 46 moves portions of the patient 22 through gantry opening 48.

In one embodiment, the computer 36 includes a device 50, for example, a floppy disk drive or CD-ROM drive, for reading instructions and/or data from a computer-readable medium 52, such as a floppy disk or CD-ROM. In another embodiment, the computer 36 executes instructions stored in firmware (not shown). The computer 36 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

Also, it should be understood that the computer 36, display 42 and user interface 40 may be provided separate from the system 10 for processing data. The acquired CT datasets may be transferred over a network, internet, by portable disk, and the like, for processing at a location remote from the system 10.

Figure 3:
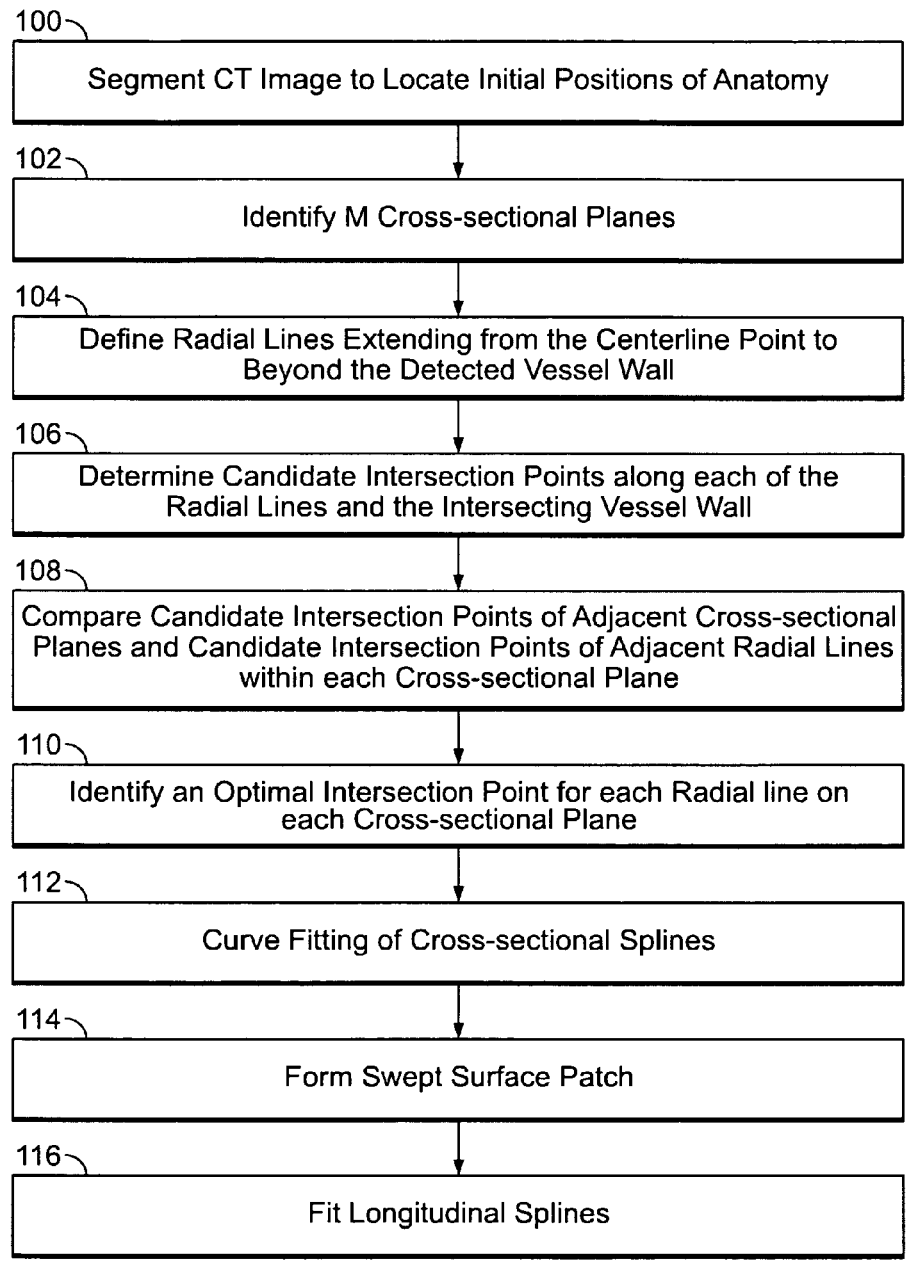
FIG. 3 illustrates a method for automatically fitting a contour of a vessel with a 3D mesh having splines oriented in two different directions in accordance with an embodiment of the present invention.

FIG. 3 illustrates a method for automatically fitting a contour of a vessel with a 3D mesh having splines oriented in two different directions. It is desirable to detect an inner surface or contour of a blood vessel, also referred to as the lumen, to evaluate and/or measure plaque deposits or other anomalies associated with the vessel. At 100, the computer 36 segments a CT image to locate initial positions of anatomy within the CT image. Segmenting may also be referred to as automatic structure extraction. The anatomy includes vessels, which may also be described as cylindrical objects. During segmentation, initial positions of the lumen and the background of the vessel are located. Optionally, the centerline within the vessels may also be determined. Although the following discussion is related to blood vessels such as cardiac vessels and carotid and femoral arteries, the method may also be used to detect the surface of other anatomical structures.

The detected lumen of the vessel may also be referred to herein as a surface or contour of the vessel. The contour has many points which define the shape of the vessel. Previously, a user would have to manually free-hand draw the vessel to correct any areas which were not correctly detected; a process which may be time consuming and is prone to error. The 3D mesh provides a smaller number of "control points" through which the user can interact to adjust or influence the shape of the contour.

Figure 4:
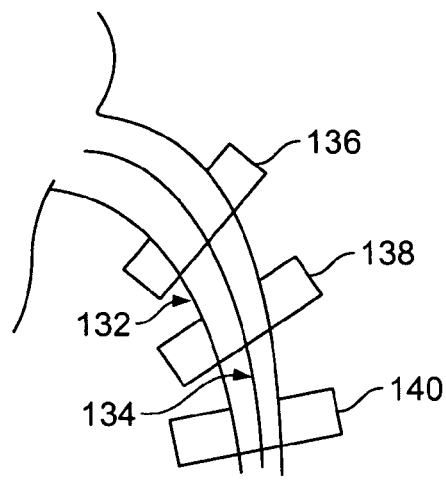
FIG. 4 illustrates first, second through M cross-sectional planes extending through a segmented vessel in accordance with an embodiment of the present invention.

At 102, the computer 36 identifies M cross-sectional planes through the vessel. FIG. 4 illustrates first, second through M cross-sectional planes 136, 138 and 140 extending through a segmented vessel 132. The first through M cross-sectional planes 136-140 are located perpendicular with respect to centerline 134 and extend a small distance beyond the vessel 132.

Returning to FIG. 3, at 104 the computer 36 defines radial lines extending from the centerline 134 to beyond the detected vessel wall for each of the first through M cross-sectional planes 136-140. Each of the first through M cross-sectional planes 136-140 has the same number and general orientation of radial lines.

Figure 5:
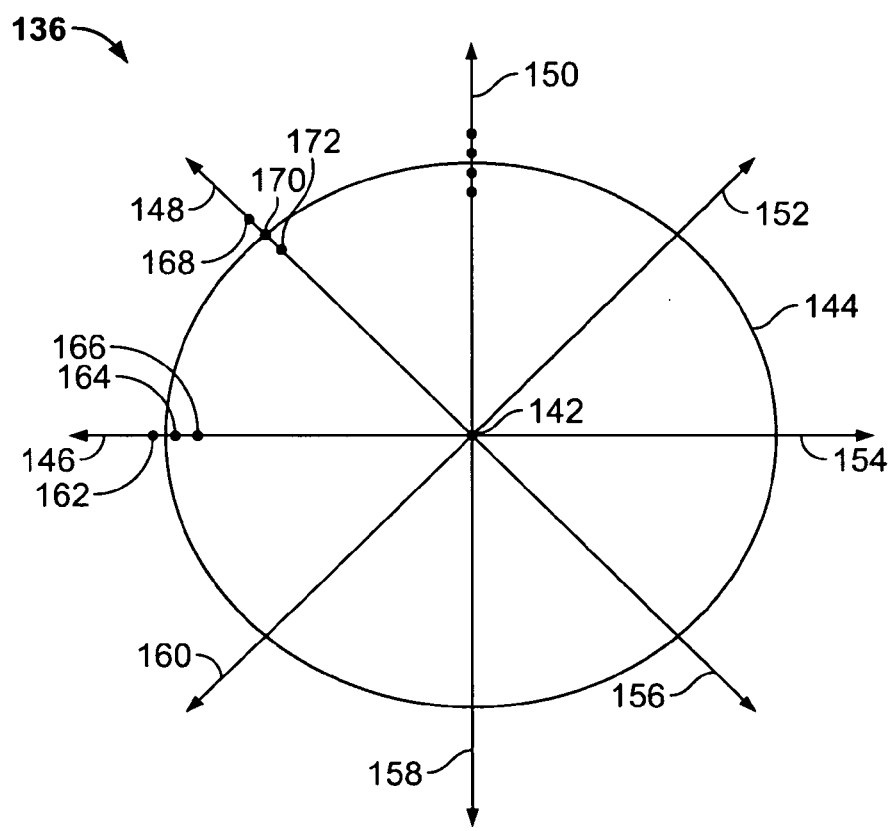
FIG. 5 illustrates the first cross-sectional plane with radial lines defined thereon which extend from a centerline point to beyond the vessel wall in accordance with an embodiment of the present invention.

FIG. 5 illustrates the first cross-sectional plane 136 with radial lines defined thereon. First through eighth radial lines 146-160 extend from centerline point 142 to beyond vessel wall 144 which was detected at 100 of FIG. 3. It should be understood that more or less radial lines may be used.

Returning to FIG. 3, at 106 the computer 36 determines a plurality of candidate intersection points along each of the first through eighth radial lines on each cross-sectional plane, such as the first through eighth radial lines 146-160 on the first cross-sectional plane 136. In FIG. 5, candidate intersection points 162-166 are illustrated along the first radial line 146 and candidate intersection points 168-172 are illustrated along the second radial line 148. Although three candidate intersection points 162-172 are illustrated on each of the first and second radial lines 146 and 148, and four candidate intersection points (without item numbers) are illustrated on the third radial line 150, it should be understood that different numbers of candidate intersection points may be determined. Also, radial lines may have different numbers of candidate intersection points with respect to each other.

The candidate intersection points are potential points of intersection between a radial line and the vessel wall 144. The candidate intersection points may be based on the CT interpolated values along the radial line. Thus, determining candidate intersection points may be reduced to a one-dimensional analysis of interpolated values along the radial lines. By way of example, the probability of an interpolated value being close to the vessel boundary may be based on the closeness of an inner interpolation value of two consecutive interpolation values to predefined vessel lumen and/or soft plaque values. Also, for example, edge strength based on consecutive interpolation values may be used. It should be understood that other comparisons and detection methods may be used to identify candidate intersection points.

The computer 36 then determines an optimal intersection point for each of the radial lines on each of the cross-sectional planes. The optimal intersection points will define points on the surface of the vessel through which splines of the 3D mesh are fit. The primary metrics involved are the segmentation results (100) where the detected vessel wall lies along the radial lines, and the curvatures relative to $\theta$ and $\lambda$ for the spline surface to intersect the intersection points. One possible approach is to employ dynamic programming methods where the optimal substructure is:

$$F(i,j)=\min(F(i-1,0)+C(i,0,0), F(i-1,1)+C(i,0,1), \ldots, F(i-1,q-1)+C(i,0,q-1), F(i-1,0)+C(i,1,0), F(i-1,1)+C(i,1,1), \ldots, F(i-1,1)+C(i,1,q-1),$$

$$\ldots$$

$$F(i-1,0)+C(i,q-1,0), F(i-1,1)+C(i,q-1), \ldots F(i-1,q-1)+C(i,q-1,q-1))$$ Equation 1

C(i,a,b) is a curvature cost from candidate point, a, on radial sampling line i−1, to candidate point, b, on radial sampling line I; wherein 0<=a<=q−1, 0<=b<=q−1, and 0<=i<=r; and wherein q is the number of candidate intersection points on one radial line, and r is the number of radial lines.

In other words, at 108 of FIG. 3 the computer 36 compares candidate intersection points of adjacent cross-sectional planes and compares candidate intersection points of adjacent radial lines within each cross-sectional plane to identify intersection points that represent a minimal level of discontinuity. The comparisons may be accomplished concurrently and/or iteratively with respect to each other.

Figure 6:
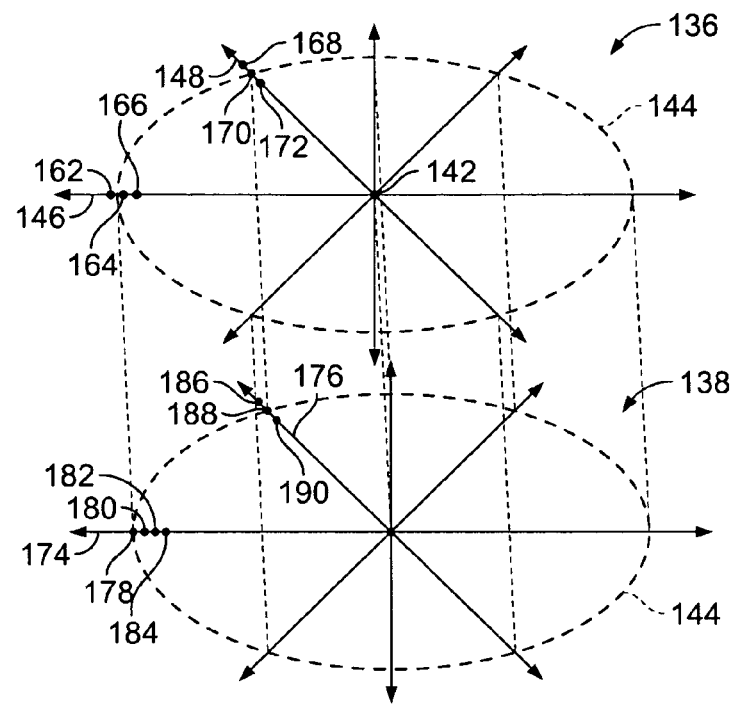
FIG. 6 illustrates the first and second planes with the radial lines defined thereon extending beyond the detected vessel wall in accordance with an embodiment of the present invention.

FIG. 6 illustrates the first and second cross-sectional planes 136 and 138 with the radial lines defined thereon and extending beyond detected vessel wall 144. Like item numbers have been used with respect to FIG. 5. The computer 36 compares the candidate intersection points 162-166 on the first radial line 146 of the first cross-sectional plane 136 to candidate intersection points 178-184 on a first radial line 174 of the second cross-sectional plane 138. The computer 36 applies the assumption that the vessel 132 is a relatively smooth surface without sharp kinks, changes or discontinuities, and thus between the first and second cross-sectional planes 136 and 138, the discontinuity or change in the vessel wall 144 should be minimal. The comparison between the candidate intersection points is accomplished for each set of radial lines between each set of adjacent cross-sectional planes.

The computer 36 also compares the candidate intersection points of adjacent radial lines within the same cross-sectional plane. The candidate intersection points 162-166 along the first radial line 146 of the first cross-sectional plane 136 may be compared to the candidate intersection points 168-172 along the second radial line 148, and the candidate intersection points 178-184 along the first radial line 174 of the second cross-sectional plane 138 may be compared to candidate intersection points 186-190 along second radial line 176. The comparison between the candidate intersection points on adjacent radial lines within the same cross-sectional plane is accomplished for each set of adjacent radial lines on each cross-sectional plane. The concurrent and/or iterative comparisons result in a sub-set of candidate intersection points providing a minimum discontinuity between the adjacent radial lines as well as between the adjacent cross-sectional planes.

At 110, the computer 36 identifies an optimal intersection point for each radial line on each cross-sectional plane. The optimal intersection point defines a most likely point at which the radial line intersects the vessel wall 144. It should be understood that an optimal intersection point may be any point along a radial line, and is not limited to initially identified candidate intersection points.

Once the optimal intersection points have been determined, at 112 the computer 36 performs curve fitting of a first set of splines in a first direction, which are referred to herein as cross-sectional splines. The cross-sectional splines intersect at a plurality of control points which the user can interact with as discussed below. The cross-sectional splines join adjacent optimal intersection points to form circular cross-sectional contours within the cross-sectional planes. Therefore, the cross-sectional splines model the intersection of the vessel wall with the cross-sectional plane. The splines may be Cubic Splines, a B-Spline variant, Catmull-Rom splines or polynomial splines, for example.

At 114, the computer 36 forms a surface patch as a swept surface, such as of bi-parametric b-splines, to form a complete model of the wall of the vessel 132. The swept surface parameters are $\theta$ and $\lambda$. Parameter $\theta$ spans from 0 to $2\pi$. Given n radial lines, the patch intersects the vessel wall intersection point when $\theta=2\pi(i/n)$ for integer i, 0<=i<=n. The parameter $\lambda$ spans from 0 to 1. Given m cross-sectional planes, the patch intersects a cross-section, j, when $\lambda=j/(m-1)$.

At 116, the computer 36 fits a second set of splines in a second direction, which are herein referred to as longitudinal splines, by joining optimal intersection points of adjacent cross-sectional planes. The $\lambda$ parameter spans the longitudinal splines that fit through corresponding control points, which are the optimal intersection points, within each of the cross-sectional closed spline curves to form open longitudinal spline curves. The splining along $\lambda$ can also use one of a variety of splines, such as Cubic, B-Spline, polynomial, or Catmull-Rom splines.

Figure 7:
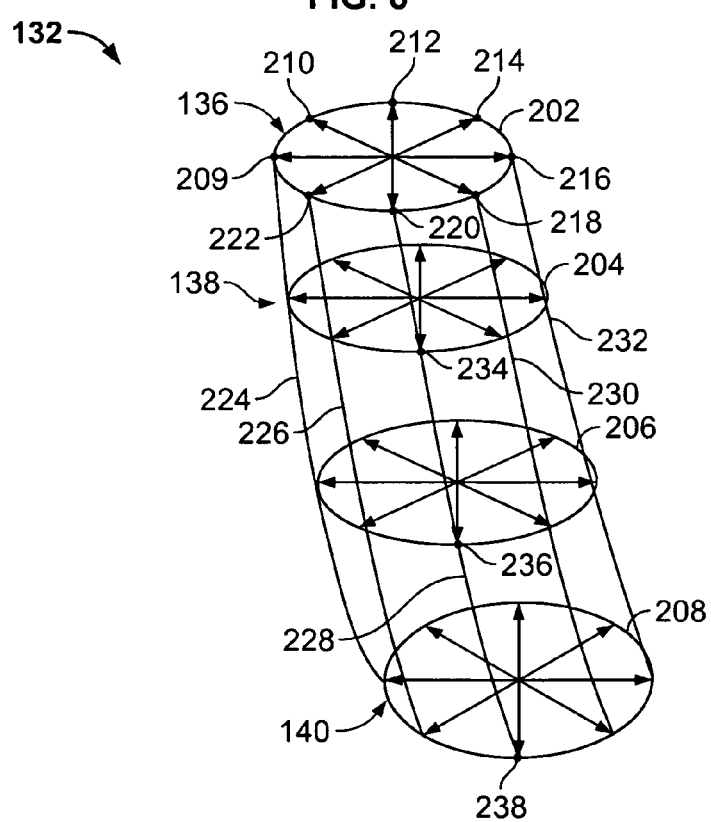
FIG. 7 illustrates a 3D mesh of closed spline curves and open spline curves fit to a contour or surface of the vessel in accordance with an embodiment of the present invention.

FIG. 7 illustrates a 3D mesh of closed spline curves and open spline curves fit to a contour or surface of the vessel 132. Therefore, two sets of splines in two different directions are used to form a 3D mesh describing the elongated structure, in this case, the vessel 132. The cross-sectional splines form cross-sectional contours 200-206. For example, optimal intersection points 209-222, corresponding to intersections of the first through eighth radial lines 146-160, respectively, with the vessel wall of FIG. 5, are fit with the cross-sectional splines to form the cross-sectional contour 200. Longitudinal contours 224-232 are also illustrated. By way of example, the longitudinal contour 228 may be formed by joining optimal intersection points 220, 234, 236 and 238 identified along the cross-sectional contours 202, 204, 206 and 208, respectively. Although not illustrated in FIG. 7, when displayed to a user on the display 42, the 3D mesh is shown on top of, or superimposed on, the diagnostic CT dataset of the vessel 132.

The cross-sectional contours 200-206 and the longitudinal contours 224-232 together form an editable 3D mesh. The 3D mesh provides a smaller number of editable control points which may be used to adjust the automatically detected contour to better follow the contour of the vessel 132.

Figure 8:
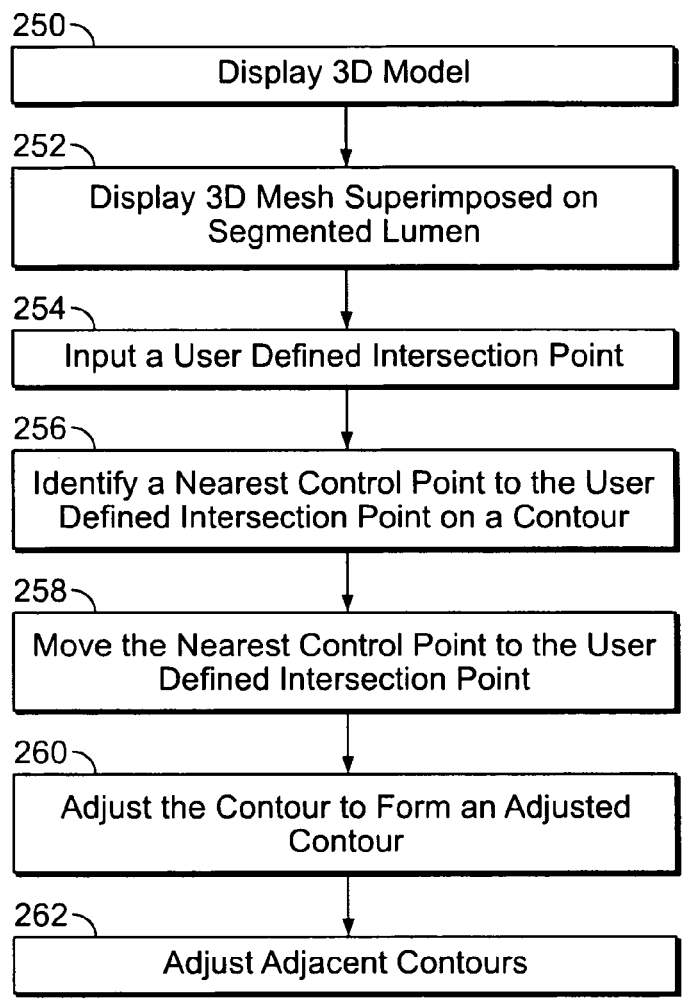
FIG. 8 illustrates a method for interacting with the 3D mesh to change the automatically detected contours with respect to a visual display of the anatomical data representative of the vessel in accordance with an embodiment of the present invention.

FIG. 8 illustrates a method for interacting with the 3D mesh to change the automatically detected contours with respect to a visual display of the anatomical data representative of the lumen of the vessel 132. It should be understood that the 3D mesh may be modified remote from the system 10 of FIG. 2, such as on a separate workstation, computer, PACS review station and the like, as previously discussed. At 250, the computer 36 displays a 3D model of the vessel 132 on the display 42. At 252, the computer 36 displays the 3D mesh comprising the cross-sectional contours 200-206 and longitudinal contours 224-232 superimposed on the 3D model of the vessel 132 to indicate the optimal vessel wall as automatically calculated in FIG. 3. A plurality of views may be used to display the lumen as well as the contours of the 3D mesh to facilitate review and adjustment of the automated results.

For example, cross-sectional views may be displayed which are based on the first through M cross-sectional planes 136-140. Alternatively, long views traveling the length of the vessel wall 144 may be displayed. For example, the long views may be either curved reformat views, or planar intersection views tangent to the centerline 134. These views may offer the user the ability to indicate new intersection points which the B-spline (or other spline if used) of a contour is to be fitted through.

Figure 9:
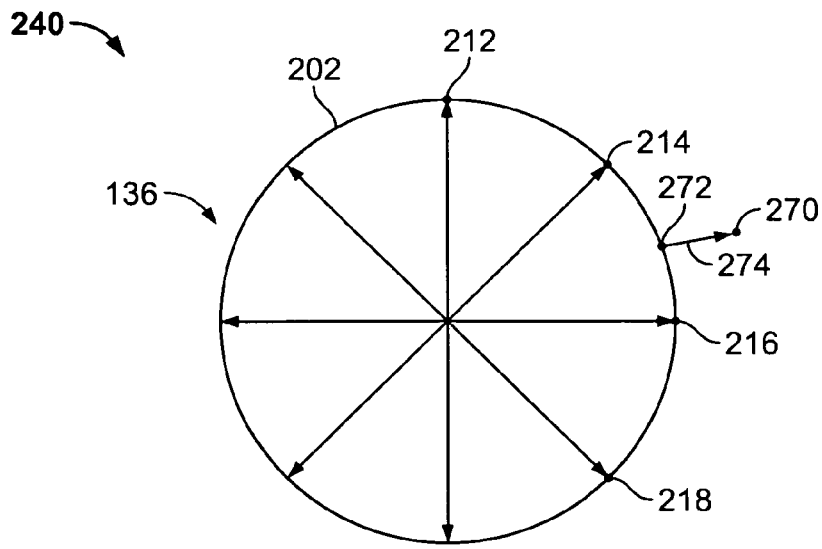
FIG. 9 illustrates an example of editing a cross-sectional view in accordance with an embodiment of the present invention.

FIG. 9 illustrates an example of editing a cross-sectional view 240. The cross-sectional plane 136 is illustrated with the cross-sectional contour 202 and optimal intersection points 212-218. It should be understood that the cross-sectional contour 202 comprises many control points and optimal intersection points, defining the radial contour of the vessel 132. The user reviews the lumen (not shown in FIG. 9) with respect to the cross-sectional contour 202 to determine any areas which may need adjustment. At 254 of FIG. 8, the user inputs a user defined intersection point using the user interface 40. The user defined intersection points do not need to be B-Spline control points as identified by the contours and as typically provided by B-Spline user interfaces, but may instead be any point which the user wants the B-Spline curve to intersect.

The user may input the user defined intersection point in a variety of ways. For example, the user may click on a desired intersection point, such as user defined intersection point 270 (FIG. 9). At 256, the computer 36 identifies a nearest control point 272 along the cross-sectional contour 202. At 258, the computer 36 moves the nearest control point 272 in the direction of arrow 274 to the position of the user defined intersection point 270. Alternatively, the user may use an interface device such as a mouse to click on the cross-sectional contour 202. The computer 36 identifies the nearest control point 272. The user then drags the control point 272 of the cross-sectional contour 202 to the user defined intersection point 270.

In general, when the user selects a user defined intersection point, the B-Spline constraints to intersect the optimal intersection points, such as the optimal intersection points 212-218, along the radial contour with the vessel wall 144 are relaxed, allowing preference for the user interactions. At 260, the computer 36 adjusts control points that are adjacent to and/or approximate to the control point 272 along the cross-sectional contour 202 to reflect a positional change based on the user defined intersection point 270. The splines of the cross-sectional contour 202 are then fitted through the adjusted control points.

Figure 10:
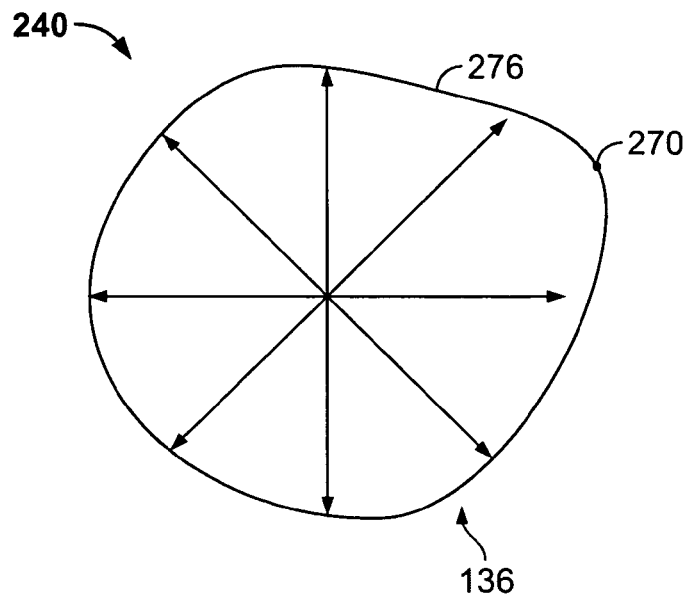
FIG. 10 illustrates the cross-sectional contour of FIG. 9 which has been revised based on a desired intersection point in accordance with an embodiment of the present invention.

FIG. 10 illustrates the cross-sectional view 240 wherein the cross-sectional contour 202 of FIG. 9 has been adjusted based on the user defined intersection point 270 and the adjusted control points. The number of additional control points which are adjusted to form adjusted cross-sectional contour 276 may be based on the order of spline used when fitting the cross-sectional contour 202.

Figure 11:
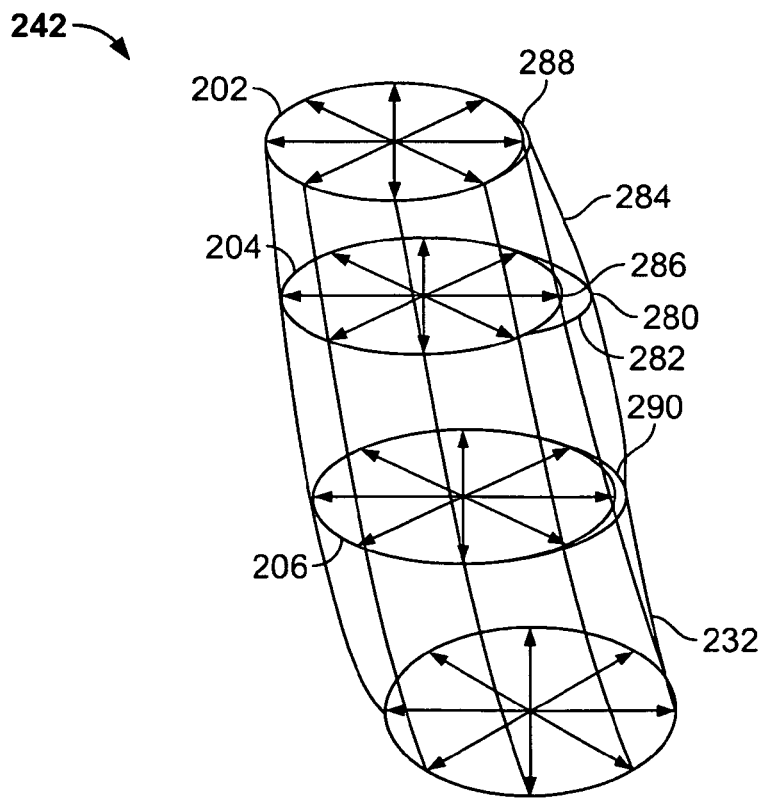
FIG. 11 illustrates changes to the 3D mesh as user defined intersection points are input in accordance with an embodiment of the present invention.

The changes to the cross-sectional contour 202 discussed above may also impact additional cross-sectional and longitudinal contours which may or may not share intersecting control points with the cross-sectional contour 202. FIG. 11 illustrates a longitudinal view 242 of changes to the 3D mesh as user defined intersection points are input. The user selects or otherwise identifies a user defined intersection point 280 to adjust the cross-sectional contour 204. The computer 36 identifies nearest control point 286, and adjusts the position of the control point 286 as well as adjacent control points along the cross-sectional contour 204. The splines are fitted through the adjusted control points to form adjusted cross-sectional contour 282. The selection of the user defined intersection point 280 impacts the longitudinal contour 232, as well, which shares at least the control point 286 with the cross-sectional contour 204.

Returning to FIG. 8, at 262 the computer 36 adjusts one or more additional contours with respect to the user defined intersection point 280 and the adjusted control points along adjusted cross-sectional contour 282. In FIG. 11, adjacent control points located along the longitudinal contour 232 are adjusted, and the splines fitted through to form adjusted longitudinal contour 284.

Additional cross-sectional and longitudinal contours may be impacted by a change. For example, adjacent cross-sectional contours 202 and 206 may also be affected. The longitudinal contour 232 may be adjusted beyond each of the cross-sectional contours 202 and 206, and the cross-sectional contours 202 and 206 may be adjusted to form adjusted cross-sectional contours 288 and 290, respectively. It is possible that additional cross-sectional contours and/or longitudinal contours may also be affected.

The user may also adjust the shape of one longitudinal spline directly, and adjacent cross-sectional splines that share the control points of the longitudinal spline are updated to continue to maintain the smooth contour. The user may change the view displayed as the contours are edited, and may input more than one user defined intersection point.

Once the user defined intersection point is input, the computer 36 performs the adjustment to local areas of the vessel 132 which, by nature of the shape of vessels, most likely approximate a smoothly curved surface. This provides a more predictable and accurate result. The user can continue to interact with the 3D mesh to refine the contours as needed. Therefore, the user may iteratively update or modify the 3D mesh. The computer 36 provides immediate results that can be reviewed and validated by the user on the display 42. There is no need for the user to select each individual control point on the cross-sectional and longitudinal contours, and no need for the user to manually select changes point by point.

When the user is satisfied with the contours identified by the 3D mesh, the vessel may be extracted and used for subsequent calculations. Location, size and composition of plaque deposits can be measured and analyzed, as well as parameters associated with blood flow, diameter and restrictions within the vessel.

A technical effect is the automated detection of contours of vessel walls which are fit with an editable 3D mesh. The contours are detected by calculating minimal discontinuities between adjacent points defined on a cross-sectional plane and between points defined on adjacent cross-sectional planes. The user can review and edit the 3D mesh with respect to the lumen. The user can easily exclude plaque deposits and thus calculations are more accurate.

While the invention has been described in terms of various specific embodiments, those skilled in the art will recognize that the invention can be practiced with modification within the spirit and scope of the claims.

What is claimed is:

1. A method for processing a vessel within a diagnostic image, comprising:
   automatically segmenting, with a computer, a three dimensional (3D) vessel within a diagnostic image;
   automatically fitting a contour of the vessel 3D mesh comprising splines arranged in at least first and second directions substantially surrounding, the vessel, the splines providing a plurality of editable control points, the splines in the first direction intersecting with the splines in the second direction at intersection points based on a likelihood of intersecting with a boundary of the 3D e vessel;
   and adjusting a position of at least one control point on the 3D mesh based on a user input.

2. The method of claim 1, wherein the vessel is one of a coronary vessel, a carotid vessel and a femoral vessel.

3. The method of claim 1, further comprising:
   defining a centerline along a length of the vessel;
   defining cross-sectional planes perpendicular to the centerline, a first portion of the splines encircling the contour of the vessel to form cross-sectional contours corresponding to the cross-sectional planes;
   selecting a first control point along a first cross-sectional contour with the user input; and
   moving the first control point to a second position, at least a portion of the splines forming the first cross-sectional contour being modified based on the second position.

4. The method of claim 1, further comprising:
   defining cross-sectional planes along a length of the vessel, a first portion of the splines encircling the contour of the vessel to form cross-sectional contours corresponding to the cross-sectional planes, a second portion of the splines in the second direction intersecting one of the intersection points along each of the cross-sectional contours;
   moving a second control point to a second position with the user input, the second control point being along a spline in the second direction; and
   modifying the at least one cross-sectional contour located proximate to the second control point based on the second position.

5. The method of claim 1, further comprising:
   defining a centerline along a length of the vessel;
   defining cross-sectional planes perpendicular to the centerline, a first portion of the splines encircling the contour of the vessel to form cross-sectional contours corresponding to the cross-sectional planes, a second portion of the splines in the second direction intersecting one of the intersection points along each of the cross-sectional contours;
   selecting a user defined intersection point with the user input;
   identifying a control point located closest to the user defined intersection point, the control point being on one of the first and second portions of the splines; and
   modifying at least one cross-sectional contour and at least one of the splines in the second direction based on the control point and the user defined intersection point.

6. The method of claim 1, further comprising defining a centerline along a length of the vessel, the first and second directions comprising radial and longitudinal directions with respect to the centerline.

7. The method of claim 1, adjusting a position of the at least one control point with the user input by one of selecting a user defined intersection point located beyond the splines of the 3D mesh and dragging the at least one control point to the user defined intersection point.

8. The method of claim 1, further comprising:
   calculating an adjusted 3D mesh based on an adjusted position of the at least one control point; and
   calculating a parameter associated with the vessel based on the adjusted 3D mesh, the parameter being one of blood flow within the vessel, a diameter of the vessel, size of a plaque deposit within the vessel, position of a plaque deposit within the vessel, and composition of a plaque deposit within the vessel.

9. A computer for processing computed tomography (CT) diagnostic image data, comprising:
   a user interface; and
   a processor coupled to the user interface, the processor configured to:
   automatically segment a three dimensional (3D) vessel within a CT image;
   automatically fit a contour of the vessel with a 3D mesh comprising splines in at least first and second directions, the splines providing a plurality of editable control points, the splines in the first direction intersecting with the splines in the second direction at intersection points based on a likelihood of intersecting with a boundary of the 3D vessel;
   and adjust a position of at least one control point on the 3D mesh based on a user defined intersection point input by an operator using the user interface.

10. The computer of claim 9, further comprising the user interface adjusting the position of the at least one control point to modify at least one of a shape, size and a position of a portion of the 3D mesh, the processor calculating an updated 3D mesh based on an updated position of the at least one control point.

11. The computer of claim 9, further comprising a display for displaying diagnostic image data representative of the vessel, the 3D mesh being superimposed on the vessel.

12. The computer of claim 9, the processor further configured to:
   define cross-sectional planes within the vessel in the first direction, each of the cross-sectional planes having radial lines extending beyond the contour of the vessel; and
   select an optimal intersection point along each of the radial lines to define an intersection of the cross-sectional planes with the contour, the optimal intersection point being based on at least one of minimizing discontinuities between the radial lines located on adjacent cross-sectional planes and minimizing discontinuities between adjacent radial lines located on the same cross-sectional plane, the intersection points being based on the optimal intersection points.

13. The computer of claim 9, the processor further configured to:
- define cross-sectional planes within the vessel in the first direction, each of the cross-sectional planes having radial lines extending beyond the contour of the vessel;
- identify candidate intersection points along each of the radial lines proximate to the contour; and
- calculate a minimum curvature cost between the candidate intersection points along adjacent radial lines on at least one of the plurality of cross-sectional planes, the intersection points being based on the minimum curvature costs.

14. The computer of claim 9, the processor further configured to:
- define of cross-sectional planes within the vessel in the first direction, each of the cross-sectional planes having radial lines extending beyond the contour of the vessel;
- identify candidate intersection points along each of the radial lines proximate to the contour;
- calculate a first minimum curvature cost between the candidate intersection points along adjacent radial lines on at least one of the cross-sectional planes; and
- calculate a second minimum curvature cost between the candidate intersection points on adjacent cross-sectional planes, the intersection points being based on the first and second minimum curvature costs.

15. A method for defining a vessel within a diagnostic image, comprising:
- automatically segmenting an elongated vessel within a diagnostic image to detect a contour of the elongated vessel, the elongated vessel having radial and longitudinal directions;
- automatically defining cross-sectional planes within the vessel in the radial direction, each of the cross-sectional planes having radial lines extending beyond the contour of the vessel;
- automatically selecting an optimal intersection point along each of the radial lines to define an intersection of the cross-sectional planes with the contour, the optimal intersection points being based on at least one of minimizing discontinuities between the radial lines located on adjacent cross-sectional planes and minimizing discontinuities between adjacent radial lines located on the same cross-sectional plane; and
- automatically fitting the elongated vessel with a 3D mesh having cross-sectional splines and longitudinal splines formed along the contour in circular and longitudinal directions, respectively, the splines being based on at least the optimal intersection points.

16. The method of claim 15, further comprising:
- identifying candidate intersection points along each of the radial lines proximate to the contour; and
- calculating a minimum curvature cost between the candidate intersection points along the adjacent radial lines on at least one of the cross-sectional planes, the optimal intersection points being based on at least the minimum curvature cost.

17. The method of claim 15, the method further comprising:
- identifying a maximum gradient along each of the radial lines; and
- identifying candidate intersection points based on at least one of segmentation results and the maximum gradients, the optimal intersection points being based at least on the candidate intersection points.

18. The method of claim 15, further comprising displaying at least one view of the vessel having the 3D mesh superimposed thereon, the at least one view being one of a cross-sectional view, a longitudinal view, a curved reformat view, and planar intersection view being tangent to a centerline within the vessel.

19. The method of claim 15, further comprising:
- entering a user defined intersection point; and
- adjusting at least one optimal intersection point based on the user defined intersection point.

20. The method of claim 15, further comprising calculating a parameter associated with the vessel based on the 3D mesh, the parameter being one of blood flow within the vessel, a diameter of the vessel, size of a plaque deposit within the vessel, position of the plaque deposit within the vessel, and composition of a plaque deposit within the vessel.

21. The method of claim 1, wherein fitting the contour further comprises forming a surface patch as a swept surface comprising bi-parametric b-splines.

* * * * *

UNITED STATES PATENT AND TRADEMARK OFFICE
CERTIFICATE OF CORRECTION

PATENT NO.         : 7,940,974 B2                                                      Page 1 of 1
APPLICATION NO.    : 11/602909
DATED              : May 10, 2011
INVENTOR(S)        : Skinner et al.

It is certified that error appears in the above-identified patent and that said Letters Patent is hereby corrected as shown below:

In Column 9, Line 20, in Claim 1, delete "3D" and insert -- 3D with a --, therefor.

In Column 9, Line 22, in Claim 1, delete "surrounding," and insert -- surrounding --, therefor.

In Column 9, Line 26, in Claim 1, delete "3D e" and insert -- 3D --, therefor.

Signed and Sealed this
Twentieth Day of September, 2011

David J. Kappos
*Director of the United States Patent and Trademark Office*